United States Patent
Miao et al.

(10) Patent No.: US 9,857,942 B2
(45) Date of Patent: Jan. 2, 2018

(54) METHOD OF CONNECTING DEVICE ADAPTED TO INTERACTIVE WHITEBOARD SYSTEM AND HOST DEVICE THEREOF

(71) Applicant: Wistron Corporation, New Taipei (TW)

(72) Inventors: Pen-Tai Miao, New Taipei (TW); Ping-Hung Chen, New Taipei (TW); Fang-Wen Liao, New Taipei (TW)

(73) Assignee: Wistron Corporation, New Taipei (TW)

( * ) Notice: Subject to any disclaimer, the term of this patent is extended or adjusted under 35 U.S.C. 154(b) by 343 days.

(21) Appl. No.: 14/683,139

(22) Filed: Apr. 9, 2015

(65) Prior Publication Data

US 2016/0188170 A1  Jun. 30, 2016

(30) Foreign Application Priority Data

Dec. 24, 2014 (TW) .............................. 103145218 A

(51) Int. Cl.
*G06F 3/01* (2006.01)
*G06F 3/0481* (2013.01)
(Continued)

(52) U.S. Cl.
CPC .......... *G06F 3/04817* (2013.01); *G06F 3/038* (2013.01); *G06F 3/0484* (2013.01);
(Continued)

(58) Field of Classification Search
None
See application file for complete search history.

(56) References Cited

U.S. PATENT DOCUMENTS

2006/0259923 A1* 11/2006 Chiu .................. H04N 5/44543
 725/24
2009/0125589 A1* 5/2009 Anand ................ H04L 65/1083
 709/204

(Continued)

FOREIGN PATENT DOCUMENTS

EP 2355563 8/2011
TW 201123766 7/2011
(Continued)

OTHER PUBLICATIONS

"Office Action of Taiwan Counterpart Application" with partial English translation, dated Oct. 19, 2015, p. 1-p. 11.

*Primary Examiner* — Toan Vu
(74) *Attorney, Agent, or Firm* — JCIPRNET

(57) ABSTRACT

A method of connecting device adapted to an interactive whiteboard system and a host device thereof are provided. The host device has an interactive display device. The method includes the following steps. A scanning process is executed to receive a notification signal which is continuously broadcast by a first client device. A representative icon is obtained from an icon base, and the representative icon is set according to device information of the first client device in the notification signal, such that the representative icon is related to the first client device. The representative icon is displayed on the interactive display device, and then a broadcast termination signal is transmitted back to the first client device after the representative icon is displayed. After receiving the broadcast termination signal, the first client device stops broadcasting the notification signal.

12 Claims, 6 Drawing Sheets

(51) Int. Cl.
*G06F 3/0487* (2013.01)
*G06F 3/038* (2013.01)
*G06F 3/0484* (2013.01)
*H04N 21/422* (2011.01)
*G06F 3/00* (2006.01)
*H04L 29/06* (2006.01)

(52) U.S. Cl.
CPC ..... *G06F 3/0487* (2013.01); *H04N 21/42207* (2013.01); *G06F 2203/0384* (2013.01); *H04L 67/38* (2013.01)

(56) References Cited

U.S. PATENT DOCUMENTS

| | | | | |
|---|---|---|---|---|
| 2009/0257574 A1* | 10/2009 | Sim | ............ | G06Q 10/107 379/93.23 |
| 2010/0306424 A1* | 12/2010 | Akester | ............ | G06F 3/023 710/36 |
| 2011/0113350 A1* | 5/2011 | Carlos | ............ | G06F 21/10 715/753 |
| 2011/0190013 A1* | 8/2011 | Ting | ............ | H04W 4/00 455/466 |
| 2011/0246654 A1* | 10/2011 | Koenig | ............ | H04W 4/08 709/227 |
| 2012/0005577 A1* | 1/2012 | Chakra | ............ | G06F 3/0486 715/702 |
| 2012/0311119 A1 | 12/2012 | Chen et al. | | |
| 2013/0163019 A1* | 6/2013 | Tago | ............ | H04N 1/00442 358/1.13 |
| 2013/0215213 A1* | 8/2013 | Power | ............ | H04L 65/4076 348/14.02 |
| 2014/0019882 A1* | 1/2014 | Chew | ............ | G06Q 10/10 715/753 |
| 2015/0208217 A1* | 7/2015 | Hong | ............ | H04W 4/16 455/414.1 |
| 2016/0057609 A1* | 2/2016 | Nebel | ............ | H04W 4/206 709/219 |

FOREIGN PATENT DOCUMENTS

| | | |
|---|---|---|
| TW | 201132213 | 9/2011 |
| TW | 201349196 | 12/2013 |

* cited by examiner

METHOD OF CONNECTING DEVICE ADAPTED TO INTERACTIVE WHITEBOARD SYSTEM AND HOST DEVICE THEREOF

CROSS-REFERENCE TO RELATED APPLICATION

This application claims the priority benefit of Taiwan application serial no. 103145218, filed on Dec. 24, 2014. The entirety of the above-mentioned patent application is hereby incorporated by reference herein and made a part of this specification.

BACKGROUND OF THE INVENTION

Field of the Invention

The invention relates to a method of connecting device, and more particularly, relates to a method of connecting device adapted to an interactive whiteboard system and a host device thereof.

Description of Related Art

With advancement of network technology and electronic products, screen sharing technologies, such as WiFi display, AirPlay, Wireless Display (WiDi) and Miracast for WiFi display, are gradually popularized in various electronic devices with audio/video functions. In general, aforementioned screen sharing technologies allow users to synchronously display frame data of any electronic device on the other electronic devices. Further, some of the screen sharing technologies are even capable of allowing one electronic device to synchronously display frame data from multiple electronic devices.

A conventional whiteboard system often needs to provide specific frame data via a user device for a plurality of users nearby, and also needs to manage a plurality of user devices. US patent publication number 20120311119 discloses a remote management method and a remote management system, in which a plurality of user devices are connected to a host device to execute a specific application on the host device, and a manager device is connected to the host device to manage the user devices connected to the host device. Based on aforementioned conventional art, the whiteboard system is capable of sharing obtained frame data to all the users nearby, and effectively managing the user devices in the system.

However, when adding a new user device to the conventional whiteboard system, a user usually needs to execute a related process (e.g., a scanning process) manually on the host device or on the user device. Further, in the case where multiple user devices are to be added to the whiteboard system at different time points, the related process must be executed manually and separately at the different time points. Clearly, the conventional whiteboard system is more time-consuming and inconvenient in terms of usage.

SUMMARY OF THE INVENTION

The invention is directed to a method of connecting device adapted to an interactive whiteboard system and a host device thereof, which are capable of allowing a client device to be added to the interactive whiteboard system more easily in order to avoid a connection establishing time being overly long and inconvenience caused by manually executing the related process.

An embodiment of the invention provides a method of connecting device, which is adapted to an interactive whiteboard system. The interactive whiteboard system includes a host device, and the host device includes an interactive display device. The method of connecting device includes the following steps. A scanning process is executed to receive a notification signal which is continuously broadcast by a first client device. A representative icon is obtained from an icon base, and the representative icon is set according to device information of the first client device in the notification signal, such that the representative icon is related to the first client device. After the representative icon is displayed on the interactive display device, and then a broadcast termination signal is transmitted back to the first client device. After receiving the broadcast termination signal, the first client device stops broadcasting the notification signal.

An embodiment of the invention provides a host device, which is adapted to an interactive whiteboard system. The host device includes a communication interface, a processing unit and an interactive display device. The communication interface executes a scanning process to receive a notification signal, and the notification signal is continuously broadcast by a first client device. The processing unit is coupled to the communication interface. The processing unit receives a representative icon form an icon base, and sets the representative icon according to device information of the first client device in the notification signal, such that the representative icon is related to the first client device. The interactive display device is coupled to the communication interface and the processing unit, and configured to display the representative icon. After displaying the representative icon, the processing unit transmits a broadcast termination signal back to the first client device via the communication interface. After receiving the broadcast termination signal, the first client device stops broadcasting the notification signal.

Based on the above, the method of connecting device and the host device thereof as provided by the embodiments of the invention are adapted to the interactive whiteboard system. The client device intended to be added to the interactive whiteboard system continuously broadcasts the notification signal, and the host device executes the scanning process to receive said notification signal. Further, when the client device is added to the interactive whiteboard system, the client device is notified to stop broadcasting the notification signal. In addition, because the icon base is established in advance, the host device may correspondingly select the representative icon of client device at the same time when the client device is added to interactive whiteboard system. Said representative icon is displayed on the interactive display device of the host device to be acknowledged and operated by the users. As a result, in comparison with the manual connecting process, the client device may be added to the interactive whiteboard system in a relatively simple manner, and a time for corresponding establishing the representative icon by the interactive whiteboard system may also be reduced.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
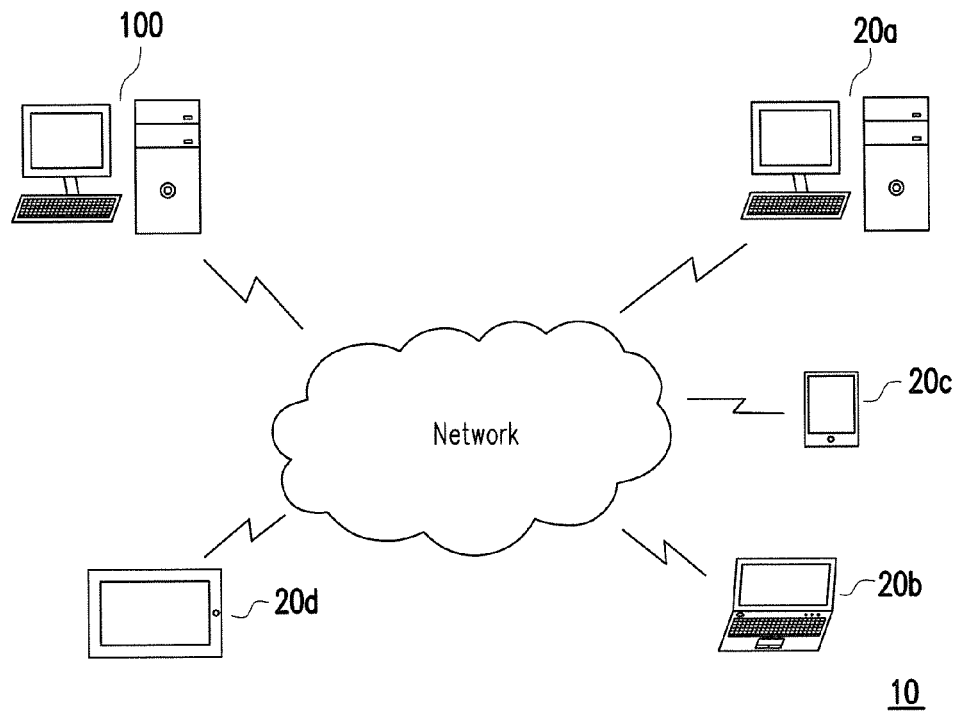
FIG. 1 is a schematic diagram illustrating an interactive whiteboard system according to an embodiment of the invention.

Descriptions of the invention are given with reference to the exemplary embodiments illustrated with accompanied drawings, in which same or similar parts are denoted with same reference numerals. In addition, whenever possible, identical or similar reference numbers stand for identical or similar elements in the figures and the embodiments.

FIG. 1 is a schematic diagram illustrating an interactive whiteboard system according to an embodiment of the invention. Referring to FIG. 1, in an embodiment of the invention, an interactive whiteboard system 10 is constituted by a plurality of electronic devices, and one of the electronic devices may be selected to serve as a host device 100. The host device 100 executes a host application of the interactive whiteboard system. The rest of the electronic devices are considered as client devices 20a to 20d. The client devices 20a to 20d execute a client application of the interactive whiteboard system. The host device 100 and the client devices 20a to 20d may be electronic devices such as a desktop computer, a notebook computer, a tablet computer, a cell phone, which are not particularly limited in the invention. In the present embodiment, the host device 100 serves as a sink which is capable of establishing a connection with the client devices 20a to 20d directly or indirectly in order to collect frame data generated by the client devices 20a to 20d. Further, those frame data are displayed on a specific screen or feedback to the client devices 20a to 20d, such that users or other personnel of the client devices 20a to 20d may share those frame data together. In addition, a user of the host device 100 may also issue control commands for the client devices 20a to 20d via a user interface. Detailed processes for establishing the connection of the client devices 20a to 20d and the host device 100 are described as follows.

Figure 2:
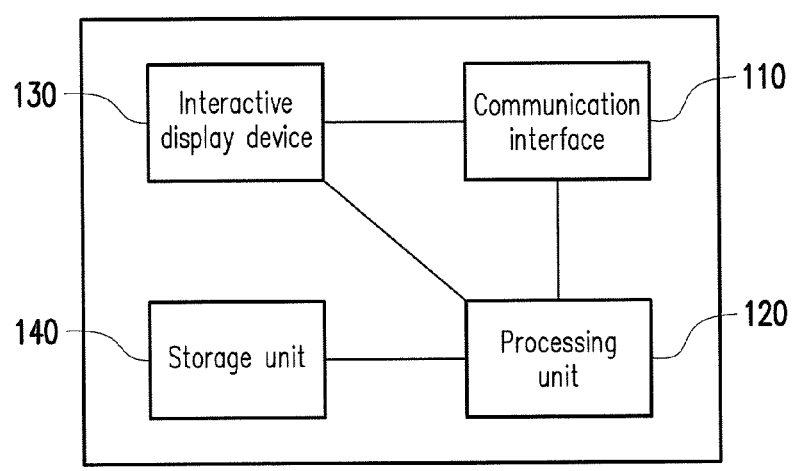
FIG. 2 is a block diagram illustrating a host device according to an embodiment of the invention.

FIG. 2 is a block diagram illustrating a host device according to an embodiment of the invention. Referring to FIG. 2, the electronic device served as the host device 100 includes a communication interface 110, a processing unit 120, an interactive display device 130 and a storage unit 140. The communication interface 110 is, for example, a wireless communication module that supports various wireless communication standards such as Bluetooth, WiFi, worldwide interoperability for microwave access (WiMax), near field communication (NFC) and long-term evolution (LTE). In other embodiments, the communication interface 110 further includes a wired communication module for connections such as asymmetric digital subscriber line (ADSL) and cable modem. The host device 100 communicates with the client devices 20a to 20d via the communication interface 110 in order to exchange data.

The processing unit 120 is coupled to the communication interface 110, and the processing unit 120 may be, for example, a central processing unit (CPU) or other programmable devices for general purpose or special purpose such as a microprocessor, a digital signal processor (DSP), a programmable controller, or similar elements or a combination of above-mentioned elements. The processing unit 120 is configured to execute various processes or software in order to provide different functions.

In an embodiment of the invention, the interactive display device 130 is coupled to the communication interface 110 and the processing unit 120, and the interactive display device 130 may be, for example, a touch display device integrated with touch function and display function, but the invention is not limited thereto. More specifically, the touch display surface may be constituted by one of various display panels (e.g., a liquid crystal display (LCD), a light-emitting diode (LED)) with one of various touch panels (e.g., resistive type touch panel, capacitive touch panel or optical type touch panels). In the present embodiment, the host device 100 displays a graphic user interface (UI) by the interactive displaying device 130, so that the user of the host device 100 may control the interactive whiteboard system 10 and manage all of the client devices 20a to 20d participated in the interactive whiteboard system 10. In other embodiments, the interactive displaying device 130 may simply be a display device, and the user may control the interactive whiteboard system 10 and manage the client devices 20a to 20d through other input devices, such as a keyboard and a mouse.

The storage unit 140 may be a hard disk drive (HDD) in any form or a movable random access memory (RAM), a read-only memory (ROM), a flash memory or other similar devices, or a combination of the above-mentioned devices.

Figure 3:
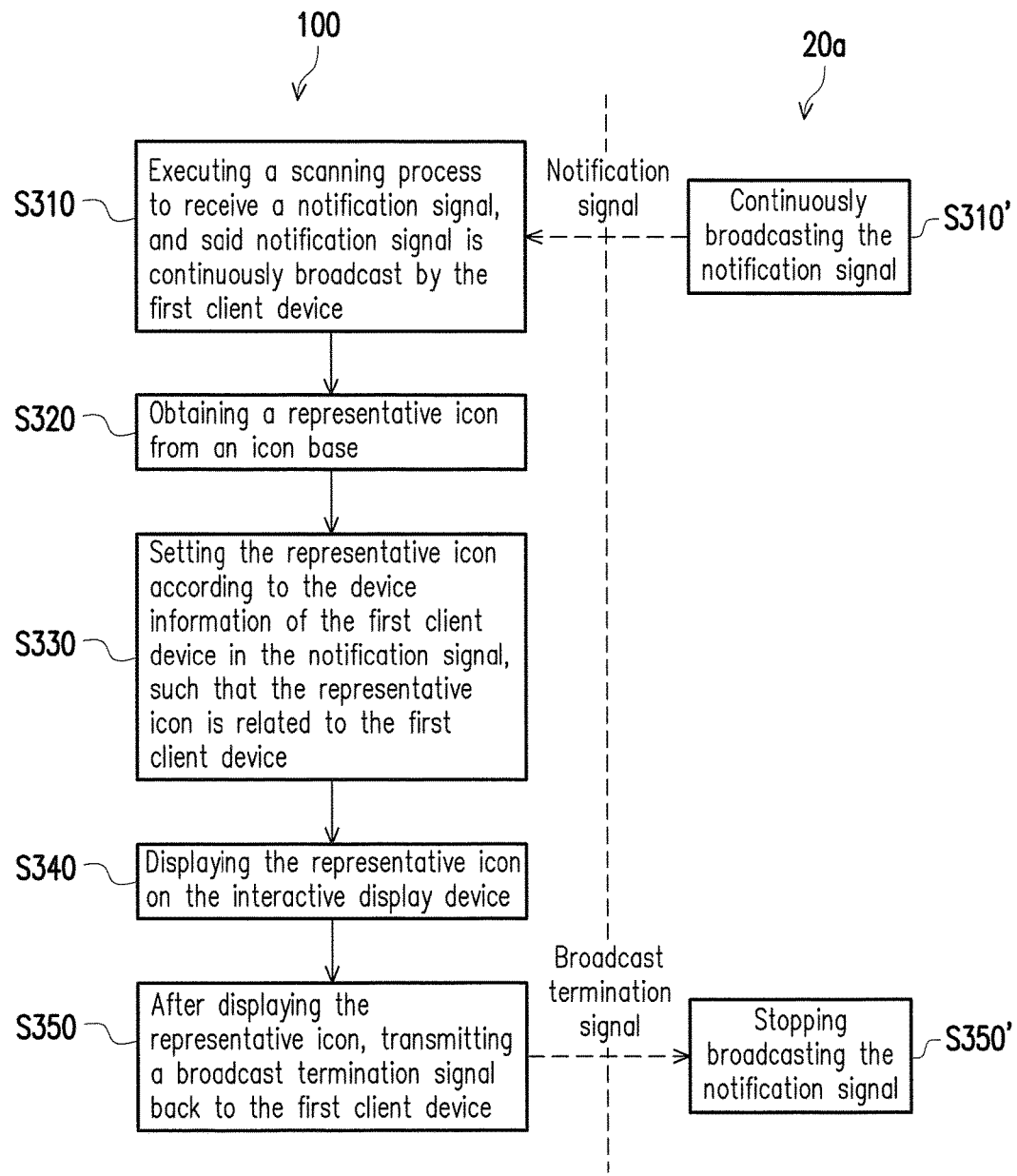
FIG. 3 is a schematic flowchart illustrating a method of connecting device according to an embodiment of the invention.
Figure 4:
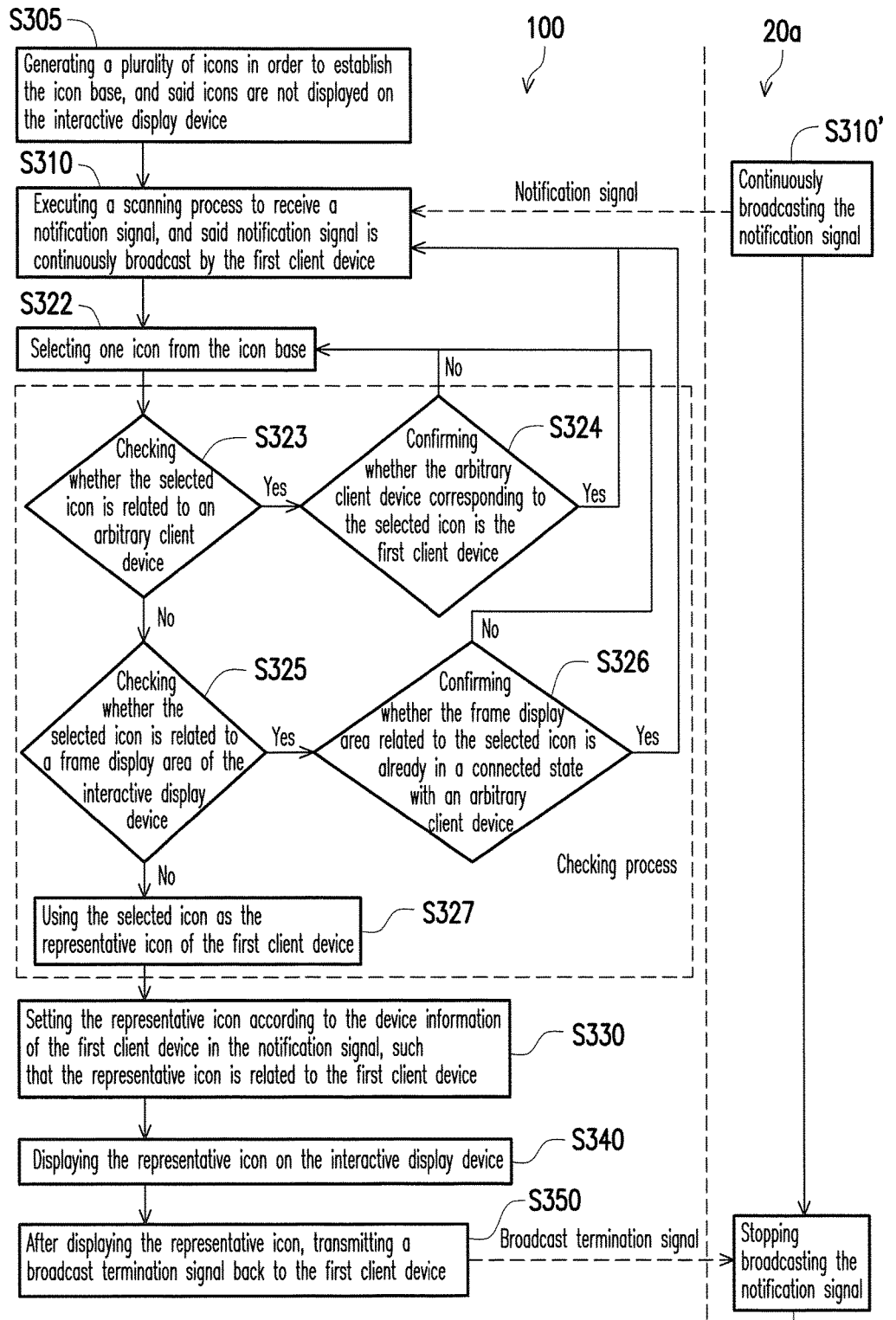
FIG. 4 is a detailed flowchart illustrating the method of connecting device according to an embodiment of the invention.

FIG. 3 is a schematic flowchart illustrating a method of connecting device according to an embodiment of the invention. FIG. 4 is a detailed flowchart illustrating the method of connecting device according to an embodiment of the invention. The method of connecting devices is adapted to the interactive whiteboard system 10 and the host device 100 as depicted in FIG. 1 and FIG. 2. It should be noted that, FIG. 3 and FIG. 4 illustrate not only the processes for executing the method of connecting device by the host device 100, but also an operational situation corresponding to a first client device (e.g., the client device 20a) being connected. Hereinafter, the method according to the embodiments of the invention is described below by reference with various modules, devices and elements in the host device 100. Each step in the playing method may be adjusted based on actual conditions, and the invention is not limited thereto.

Referring to FIG. 3, in step S310, the host device 100 executes a scanning process to receive a notification signal, and said notification signal is continuously broadcast by the first client device (e.g., the client device 20a). In an embodiment of the invention, when one electronic device is selected as the host device 100 of the interactive whiteboard system 10, the host device 100 starts, for example, the host application of the interactive whiteboard system 10 and executes the scanning process. In an embodiment of the invention, the scanning process is, for example, periodically executed by the host device 100. However, in another embodiment of the invention, the host device 100 may also execute the scanning process to receive the notification signal only after confirming that the client device 20*a* is present, so as to avoid execution of unnecessary scanning process. Moreover, in yet another embodiment of the invention, the scanning process may also be executed manually by the user of the host device 100. On the other hand, when one electronic device is served as the client device 20*a* and intended to be added to the interactive whiteboard system, the client application of the interactive whiteboard system 10 may be executed by the client device 20*a*. In this case, as shown in step S310' of FIG. 3, the client device 20*a* continuously broadcasts the notification signal. The notification signal includes device information of the client device 20*a* such as a device name, a network address (i.e., Internet Protocol address (IP address)), a media access control address (MAC address) of the client device 20*a*.

After the notification signal from the first client device (e.g., the client device 20*a*) is received by the host device 100 through the scanning process, the processing unit 120 first obtains a representative icon from an icon base, as shown in step S320. Then, as shown in step S330, the processing unit 120 sets the representative icon according to the device information of the first client device in the notification signal, such that the representative icon is related to the first client device. More specifically, the processing unit 120 stores the device information of the client device 20*a* into the storage unit 140, and links the representative icon to the device information of the client device 20*a* to be corresponding to the client device 20*a*. Subsequently, as shown in step S340, the host device 100 displays the representative icon on the interactive display device 130.

Lastly, as shown in step S350 of FIG. 3, after the representative icon is displayed on the interactive display device 130, the processing unit 120 transmits a broadcast termination signal back to the first client device (e.g., the client device 20*a*) via the communication interface 110. On the other hand, after receiving the broadcast termination signal, the first client device 20*a* stops broadcasting the notification signal, as shown in step S350'. Accordingly, the client device 20*a* may stop broadcasting the notification signal once being added to the interactive whiteboard system 10, so as to avoid further power consumption.

The main purpose of steps S320 to S340 aims to display the client device 20*a* as the representative icon on the user interface of the interactive display device 130. As such, apart from allowing the user of the host device 100 to acknowledge that the client device 20*a* is already added to the interactive whiteboard system 10, a simple operating method is also provided for the user to control the client device 20*a* by clicking or dragging the corresponding representative icon on the interactive display device 130 of the host device 100 and transmit a control signal to the client device 20*a*.

Figure 5:
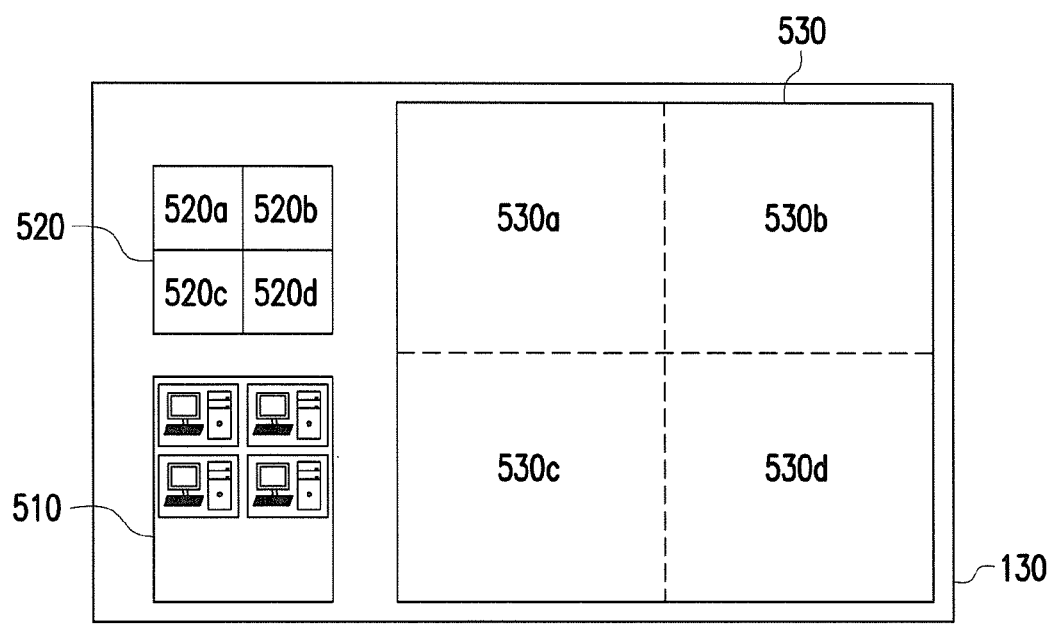
FIG. 5 is a schematic diagram illustrating a user interface according to an embodiment of the invention.

FIG. 5 is a schematic diagram illustrating a user interface according to an embodiment of the invention. It should be noted that, the user interface depicted in FIG. 5 is a user interface mainly configured to execute a screen sharing function. In FIG. 5, the interactive display device 130 of the host device 100 displays a user interface, which includes a connecting device display area 510, a frame layout area 520 and a frame display area 530. The connecting device display area 510 may display a plurality of the representative icons, and each of the representative icons represents one client device established the connection with the host device 100.

The frame layout area 520 is, for example, a four-frame layout area. In other embodiments, the frame layout area 520 is, for example, a dual-frame layout area.

Figure 6:
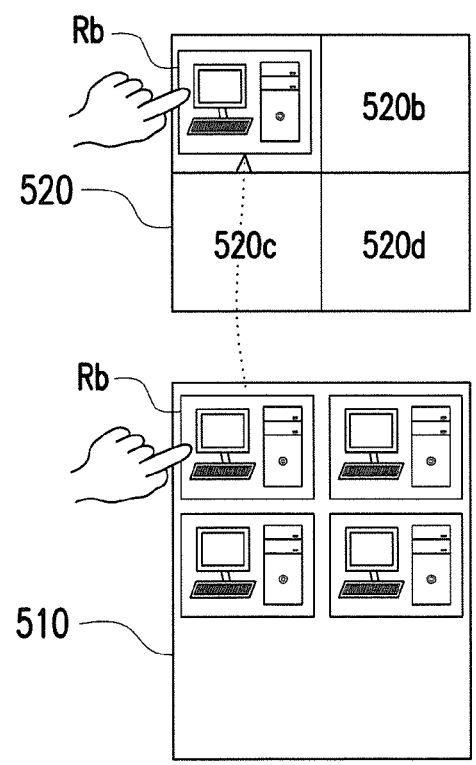
FIG. 6 is a schematic diagram illustrating operations of the user interface according to an embodiment of the invention.

FIG. 6 is a schematic diagram illustrating operations of the user interface according to an embodiment of the invention. Referring to FIG. 6, for instance, if the client device 20*b* is already established the connection with the host device 100 and a representative icon Rb of the client device 20*b* is already displayed on the connecting device display area 510, the user of the host device 100 may drag the representative icon Rb in the connecting device display area 510 to the frame layout area 520, so as to correspondingly display the frame data of the client device 20*b* on a part of the frame display area 530. Take the embodiment of FIG. 6 as an example, when the user drags the representative icon Rb of the client device 20*b* to any one of areas 520*a* to 520*d* in the frame layout area 520 with four frames, the frame data of the client device 20*b* is displayed on a corresponding one of blocks 530*a* to 530*d* in the frame display area 530. More specifically, for example, when the user drags the representative icon Rb of the client device 20*b* to the area 520*a* at upper-left of the frame layout area 520, the frame data of the client device 20*b* is, for example, displayed on the block 530*a* in the frame display area 530.

Hereinafter, description regarding how to display the representative icon related to the client device 20*b* on the interactive display device 130 is described in detail by reference with FIG. 4 to FIG. 6 below. Referring to FIG. 4 to FIG. 6, the processing unit 120 may add one representative icon to the connecting device display area 510 only after receiving the notification signal of the client device 20*a*, and then relates the representative icon to the client device. However, adding the representative icon dynamically in correspondence to each newly added client device is adverse to an operating performance and a display speed of the host device 100. Therefore, in an embodiment of the invention, before the scanning process, as shown in step S305, the processing unit 120 generates a plurality of icons in order to establish the icon base, and said icons are generated but not displayed by the interactive display device 130. Icon files of the icons are, for example, stored in the storage unit 140. In another embodiment of the invention, the processing unit 120 may also generate the icons in the icon base according to a number of connections permissible by the interactive whiteboard system 10 to connect the client devices.

Subsequently, after the notification signal broadcast by the client device 20*a* is received by the host device 100 from the scanning process (step S310); the processing unit 120 first selects one icon from the icon base and then executes a checking process for the selected icon, as shown in step S322. During the checking process, the process unit 120 checks whether the selected icon is related to an arbitrary client device, as shown in step S323. In other words, whether the selected icon is related to any other connected client device is checked. A specific checking method of the above includes, for example, checking whether the selected icon is already corresponding to a specific network address. If the selected icon is already related to an arbitrary client device, the processing unit 120 further confirms whether the arbitrary client device corresponding to the selected icon is the first client device (e.g., the client device 20*a*), as shown in step S324. A specific confirming method of the above includes, for example, comparing whether a network address corresponding to the selected icon is a network address of the first client device. When aforementioned arbitrary client device is the client device 20*a*, it indicates that the client device 20*a* is already added to the interactive whiteboard system 10 but is yet to stop broadcasting the notification signal. In this case, the host device 100 returns back to step S310 to execute the scanning process again. Oppositely, if aforementioned arbitrary client device is not the client device 20a, the host device 100 returns back to step S322 to select another one of the icons from the icon base and re-execute the checking process.

If the processing unit 120 confirms that the selected icon is not related to the arbitrary client device in step S323, the processing unit 120 checks whether the selected icon is related to the frame display area 530 of the interactive display device 130, as shown in step S325.

As shown in the embodiment of FIG. 6, the user may drag the representative icon Rb of the client device 20b to the frame layout area 520, such that the frame data of the client device 20b may be displayed on the corresponding one of the blocks 530a to 530d in the frame display area 530. Specifically, each of the areas 520a to 520d in the frame layout area 520 is related to the corresponding one of the blocks 530a to 530d in the frame display area 530, a transmission control protocol port number (TCP port number) and a user input back channel port number (UIBC port number). When the representative icon Rb is dragged to any one of the areas 520a to 520d in the frame layout area 520, the host device 100 selects the corresponding TCP port and the corresponding UIBC port in order to exchange the frame data and the control signal with the client device 20b. For instance, if the network address of the client device 20b is "192.168.1.160," and the representative icon Rb thereof is dragged to the area 520a in the frame layout area 520 with four frame, the host device 100 selects, for example, a TCP port number 60 to receive the frame data transmitted from the network address "192.168.1.160" and display the frame data on the block 530a in the frame display area 530. Conversely, the control command issued by the user of the host device 100 to the block 530a on the frame display area 530 is, for example, to select the UIBC port 101 to be transmitted to the network address "192.168.1.160."

Based on the above, step S325 mainly checks whether there is any client device once used to be related to the frame display area 530 or any one of the blocks 530a to 530d in the frame display area 530 through the selected icon. A specific checking method of the above includes, for example, confirming whether the selected icon is already dragged to the frame layout area 520. When the selected icon includes information related to the frame display area 530 or any one of the blocks 530a to 530d in the frame display area 530, the processing unit 120 further confirms whether the frame display area 530 or any one of the blocks 530a to 530d in the frame display area 530 related to the selected icon is already in a connected state with an arbitrary client device, as shown in step S326. When the frame display area 530 or any one of the blocks 530a to 530d in the frame display area 530 is already in the connected state with the arbitrary client device, the processing unit 120 re-executes the scanning process (step S310). Conversely, when the frame display area 530 or any one of the blocks 530a to 530d in the frame display area 530 is not in the connected state with the arbitrary client device, the processing unit 120 returns back to step S322 to re-select another one of the icons from the icon base and re-execute the checking process.

If the selected icon is not related to the frame display area 530 either, the selected icon is used as the representative icon of the first client device (e.g., the client device 20a), as shown in step S327. Thereafter, as shown in step S330, the representative icon is set according to the device information of the client device 20a in the notification signal, such that the representative icon is related to the client device 20a. Subsequently, as shown in step S340, the host device 100 displays the representative icon on the interactive display device 130.

It should be noted that, based different designs and functions of the user interface, the method for establishing the icons and details thereof may also be adjusted accordingly rather than limited by the specific flowchart provided in the foregoing embodiments.

Figure 7:
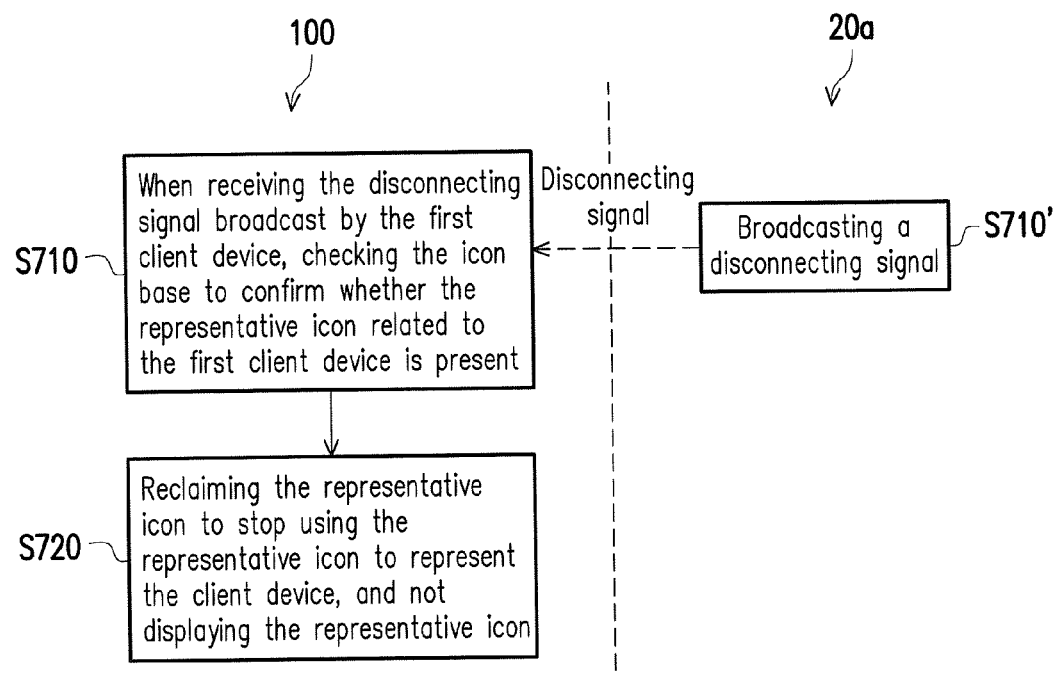
FIG. 7 is a flowchart illustrating disconnection of the client device according to an embodiment of the invention.

FIG. 7 is a flowchart illustrating disconnection of the client device according to an embodiment of the invention. Referring to FIG. 7, in an embodiment of the invention, if the first client device (e.g., the client device 20a) intends to be disconnected from the interactive whiteboard system 10, the method of connecting device further includes the following steps. First of all, the client device 20a broadcasts a disconnecting signal, as shown in step S710'. In step S710, when receiving the disconnecting signal broadcast by the client device 20a via the communication interface 110, the processing unit 120 of the host device 100 checks the icon base to confirm whether the representative icon related to the client device 20a is present. If the representative icon related to the client device 20a is present, in step S720, the processing unit 120 reclaims the representative icon to stop using the representative icon to represent the client device 20a, and does not display the representative icon on the interactive display device 130. Accordingly, the representative icon may be reclaimed to be used an unused icon in the icon base.

Figure 8:
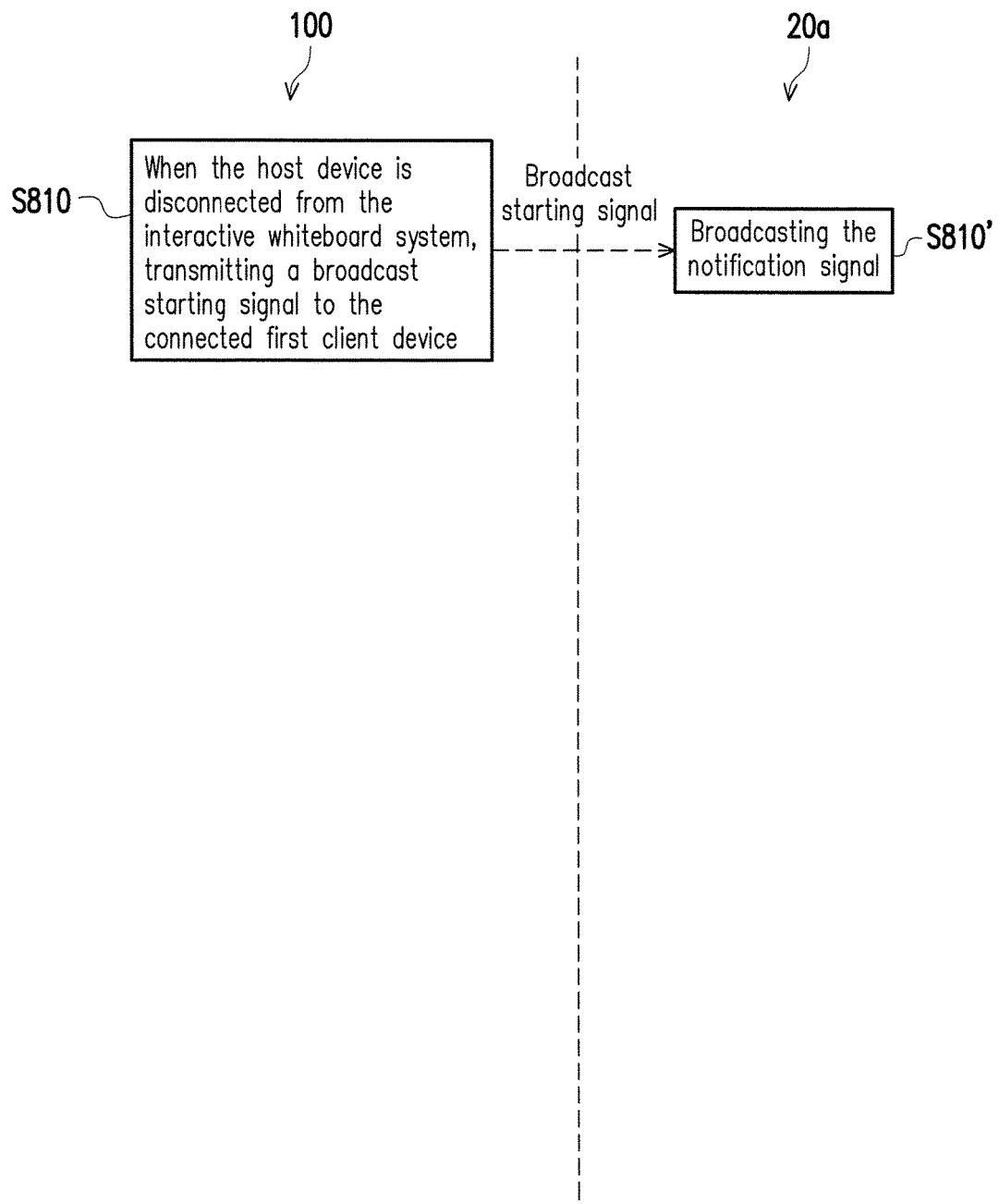
FIG. 8 is a flowchart illustrating disconnection of the host device according to an embodiment of the invention.

FIG. 8 is a flowchart illustrating disconnection of the host device according to an embodiment of the invention. Referring to FIG. 8, in an embodiment of the invention, if the host device 100 intends to be disconnected from the interactive whiteboard system 10, the method of connecting device further includes the following steps. In step S810, when the host device 100 is disconnected from the interactive whiteboard system 10, the processing unit 120 transmits a broadcast starting signal to the connected first client device (e.g., the client device 20a) via the communication interface 110. After receiving the broadcast termination signal, the first client device 20a broadcasts the notification signal, as shown in step S810'. Accordingly, the client device 20a may wait until another electronic device is selected as the host device 100 before re-connecting to the host device 100 for being added to the interactive whiteboard system 10.

In summary, the method of connecting device and the host device thereof as provided by the embodiments of the invention are adapted to the interactive whiteboard system. The client device intended to be added to the interactive whiteboard system continuously broadcasts the notification signal, and the host device executes the scanning process to receive said notification signal. Further, when the client device is added to the interactive whiteboard system, the client device is notified to stop broadcasting the notification signal. In addition, because the icon base is established in advance, the host device may correspondingly select the representative icon of client device at the same time when the client device is added to interactive whiteboard system. Said representative icon is displayed on the interactive display device of the host device to be acknowledged and operated by the users. As a result, in comparison with the manual connecting process, the client device may be added to the interactive whiteboard system in a relatively simple manner, and a time for corresponding establishing the representative icon by the interactive whiteboard system may also be reduced.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of connecting device, adapted to an interactive whiteboard system, the interactive whiteboard system comprising a host device, the host device having an interactive display device, and the method of connecting device comprising:

executing a scanning process to receive a notification signal, and the notification signal being continuously broadcast by a first client device;

obtaining a representative icon from an icon base;

setting the representative icon according to device information of the first client device in the notification signal, such that the representative icon is related to the first client device;

displaying the representative icon on the interactive display; and after displaying the representative icon, transmitting a broadcast termination signal back to the first client device, and after receiving the broadcast termination signal, the first client device stops broadcasting the notification signal, wherein the step of obtaining the representative icon from the icon base comprises:

selecting one of a plurality of icons from the icon base; and executing a checking process for the selected icon, wherein the checking process comprises:

checking whether the selected icon is related to an arbitrary client device;

if the selected icon is not related to the arbitrary client device, checking whether the selected icon is related to a frame display area of the interactive display device; and if the selected icon is not related to the frame display area, using the selected icon as the representative icon of the first client device.

2. The method of connecting device according to claim 1, further comprising:

before executing the scanning process, generating a plurality of icons in order to establish the icon base, wherein the icons are not displayed on the interactive display-device.

3. The method of connecting device according to claim 1, wherein the checking process further comprises:

if the selected icon is already related to the arbitrary client device, confirming whether the arbitrary client device corresponding to the selected icon is the first client devices;

if the arbitrary client device is the first client device, re-executing the scanning process; and if the arbitrary client device is not the first client device, selecting another one of the icons from the icon base for re-executing the checking process.

4. The method of connecting device according to claim 1, wherein the checking process further comprises:

if the selected icon is related to the frame display area, confirming whether the frame display area is in a connected state with the arbitrary client device;

if the frame display area is already in the connected state with the arbitrary client device, re-executing the scanning process; and if the frame display area is not in the connected state with the arbitrary client device, selecting another one of the icons from the icon base for re-executing the checking process.

5. The method of connecting device according to claim 1, further comprising:

when receiving a disconnecting signal broadcast by the first client device, checking the icon base to confirm whether the representative icon related to the first client device is present; and if the representative icon related to the first client device is present, reclaiming the representative icon to stop using the representative icon to represent the first client device, and not displaying the representative icon.

6. The method of connecting device according to claim 1, further comprising:

when the host device is disconnected from the interactive whiteboard system, transmitting a broadcast starting signal to the connected first client device, wherein after receiving the broadcast starting signal, the first client device broadcasts the notification signal.

7. A host device, adapted to an interactive whiteboard system, comprising:

a communication interface circuit, executing a scanning process to receive a notification signal, and the notification signal being continuously broadcast by a first client device;

a processor, coupled to the communication interface circuit, obtaining a representative icon form an icon base, and setting the representative icon according to device information of the first client device in the notification signal, such that the representative icon is related to the first client device; and an interactive display, coupled to the communication interface circuit and the processor, and configured to display the representative icon, wherein after displaying the representative icon, the processor transmits a broadcast termination signal back to the first client device via the communication interface circuit, and after receiving the broadcast termination signal, the first client device stops broadcasting the notification signal, wherein when obtaining the representative icon from the icon base, the processor first selects one of a plurality of icons from the icon base and executes a checking process for the selected icon, and the checking process comprises:

the processor checks whether the selected icon is related to an arbitrary client device, if the selected icon is not related to the arbitrary client device, the processor checks whether the selected icon is related to a frame display area of the interactive display, and if the selected icon is not related to the frame display area, the processor uses the selected icon as the representative icon of the first client device.

8. The host device according to claim 7, wherein the processor generates a plurality of icons in order to establish the icon base, and the icons are not displayed on the interactive display.

9. The host device according to claim 7, wherein the checking process further comprises:
  if the selected icon is already related to the arbitrary client device, the processor confirms whether the arbitrary client device corresponding to the selected icon is the first client devices,
  if the arbitrary client device is the first client device, the processor re-executes the scanning process, and
  if the arbitrary client device is not the first client device, the processor selects another one of the icons from the icon base for re-executing the checking process.

10. The host device according to claim 7, wherein the checking process further comprises:
  if the selected icon is related to the frame display area, the processor confirms whether the frame display area is in a connected state with the arbitrary client device,
  if the frame display area is already in the connected state with the arbitrary client device, the processor re-executes the scanning process; and
  if the frame display area is not in the connected state with the arbitrary client device, the processor selects another one of the icons from the icon base for re-executing the checking process.

11. The host device according to claim 7, wherein when receiving a disconnecting signal broadcast by the first client device via the communication interface circuit, the processor checks the icon base to confirm whether the representative icon related to the first client device is present, and
  if the representative icon related to the first client device is present, the processor reclaims the representative icon to stop using the representative icon to represent the first client device, and does not display the representative icon on the interactive display.

12. The host device according to claim 7, wherein when the host device is disconnected from the interactive whiteboard system, the processor transmits a broadcast starting signal to the connected first client device via the communication interface circuit, and after receiving the broadcast starting signal, the first client device broadcasts the notification signal.

* * * * *